United States Patent
Kawahara et al.

[11] Patent Number: 5,963,384
[45] Date of Patent: Oct. 5, 1999

[54] SIGNAL RECORDING AND REPRODUCING DEVICE FOR TRANSMITTING AND RECEIVING DATA

[75] Inventors: Minoru Kawahara; Hitoshi Tsujii; Kazuo Tomita, all of Kanagawa, Japan

[73] Assignee: Sony Corporation, Tokyo, Japan

[21] Appl. No.: 08/979,208

[22] Filed: Nov. 26, 1997

Related U.S. Application Data

[63] Continuation of application No. 08/541,039, Oct. 11, 1995, abandoned.

[30] Foreign Application Priority Data

Oct. 14, 1994 [JP] Japan .................................. 6-249003

[51] Int. Cl.⁶ .............................. G11B 5/02; G11B 15/14; G11B 5/03
[52] U.S. Cl. ................................ 360/27; 360/66; 360/67; 360/68; 360/64
[58] Field of Search .................................. 360/27, 66, 67, 360/68, 108, 64, 62, 61, 48, 49

[56] References Cited

U.S. PATENT DOCUMENTS

| | | | |
|---|---|---|---|
| 4,879,609 | 11/1989 | Kozuki | 360/66 |
| 4,985,785 | 1/1991 | Matsuoka | 360/62 |
| 5,191,489 | 3/1993 | Isozaki | 360/27 X |

*Primary Examiner*—Alan Faber
*Attorney, Agent, or Firm*—Frommer Lawrence & Haug, LLP.; William S. Frommer

[57] ABSTRACT

A signal recording device is provided for transmitting recording data signals via a rotary transformer to a rotary drum having a rotary head for recording data so that control data may be transmitted in a shorter time period and resolution along the time axis may be improved. A 1-bit start bit SB and 2-bit mode setting bits PD are followed by 3-bit group bits GP and 3-bit channel bits CL for a single bit mode, by 3-bit group bits GP and an 8-bit bit patterns BP for a multi-bit mode and by a 4-bit channel number DAN and 8-bit data DAD for D/A data. An even parity PE is appended for each of the respective modes. A continuation flag CF is further appended for the single-bit mode and the multi-bit mode.

7 Claims, 7 Drawing Sheets

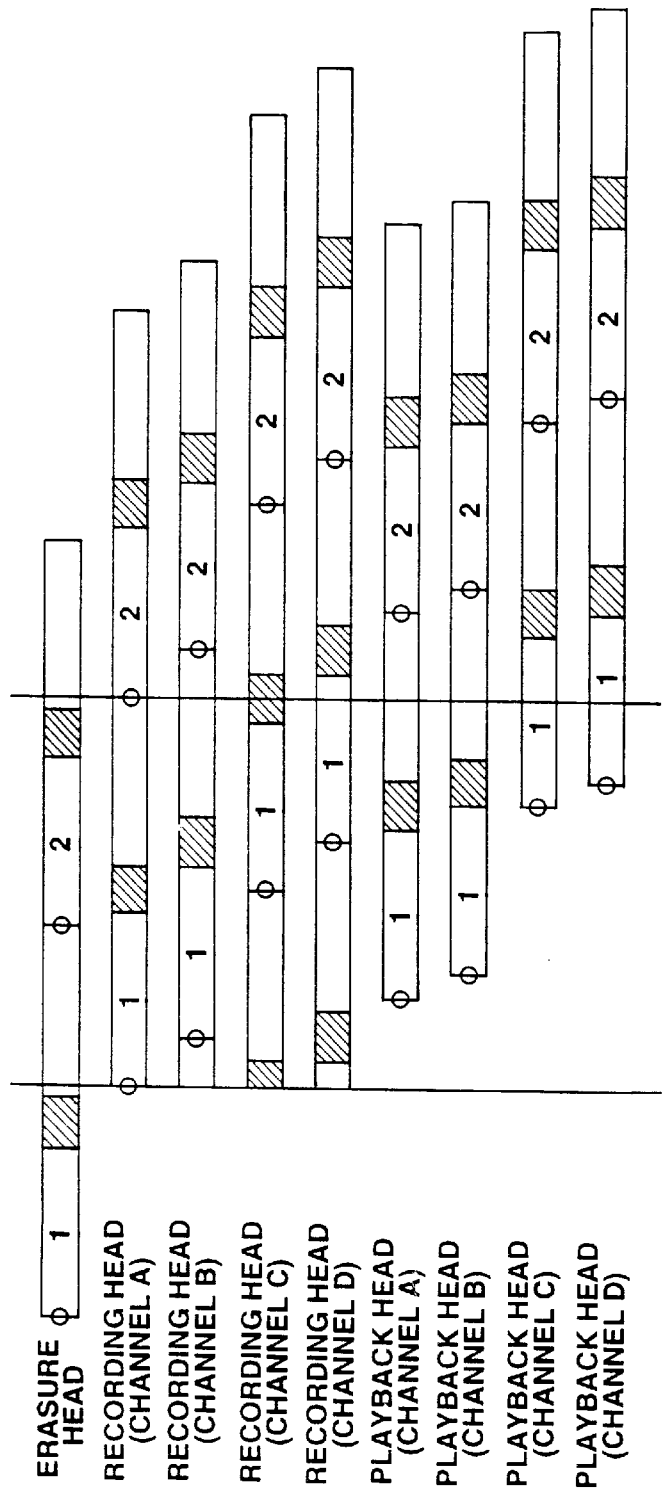

FIG.5A CLOCK SIGNAL CK

FIG.5B MODULATED SIGNAL NRZI

FIG.5C DATA SIGNAL

FIG.5D SERIAL DATA SIGNAL DASD

FIG.5E TRANSFER CLOCK SIGNAL DACK

FIG.5F TRANSFER END SIGNAL DALD

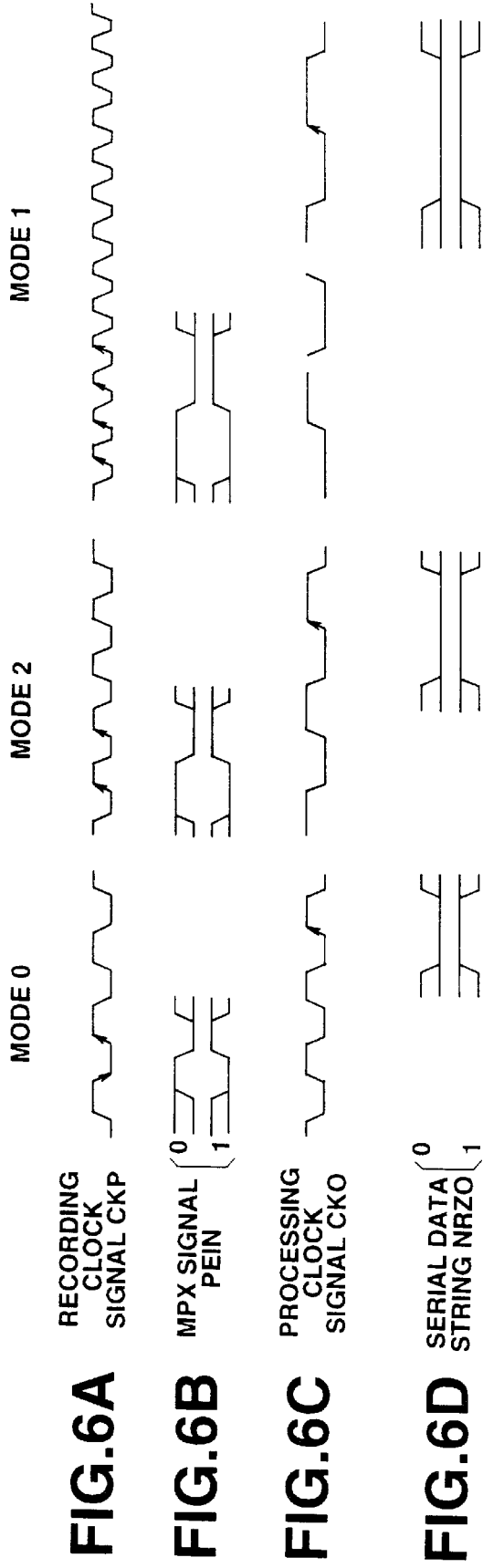

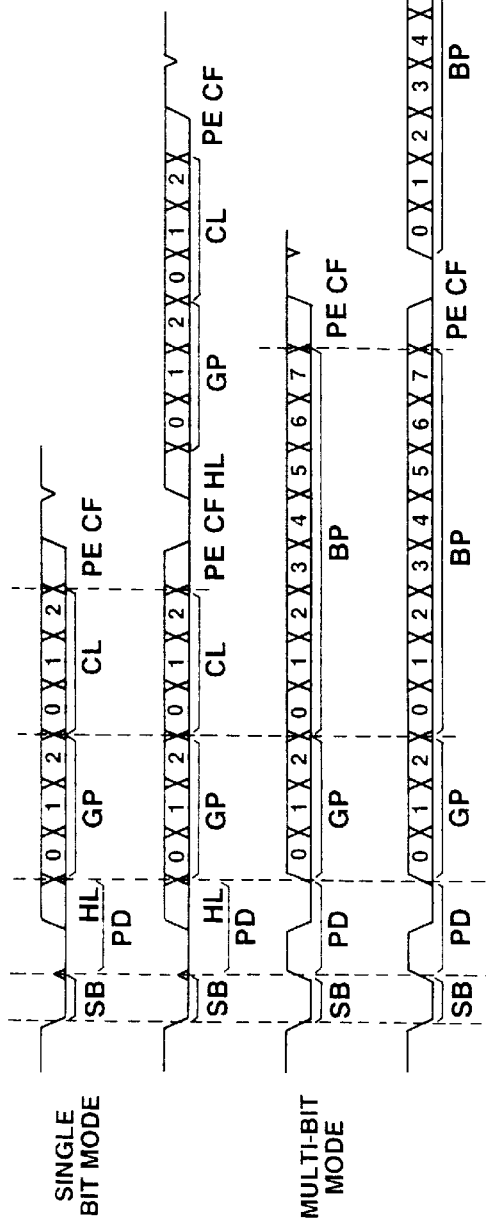

SIGNAL RECORDING AND REPRODUCING DEVICE FOR TRANSMITTING AND RECEIVING DATA

This application is a continuation of application Ser. No. 08/541,039, filed on Oct. 11, 1995, now abandoned.

BACKGROUND OF THE INVENTION

This invention relates to a signal recording device for transmitting recording data signals via a rotary transformer to a rotary drum having a rotary head for recording data.

In a video tape recorder (VTR) in which a recording medium such as a magnetic tape is used and data is recorded thereon by a rotary head provided on the rotary drum, recording signals are exchanged by a rotary transformer connected between a rotor side, that is a rotor drum side, and a stator side, that is a stator side.

FIG. 1 shows a schematic arrangement of an analog VTR. Referring to FIG. 1, the analog VTR has a simplified construction in which a recording head 40 has its winding directly connected to a winding of a rotary transformer 38, while a playback head 41 has its winding directly connected to a winding of a rotary transformer 39, and a recording amplifier 34 and a playback amplifier 35 are arranged on the stator side.

For data recording, picture signals entering a signal input terminal 30 are sent to a modulator 32 for modulation. At this time, a signal switching unit 36 is set to a terminal a, while a signal switching unit 37 is set to a terminal c. Thus, output signals of the modulator 32 are recorded via the recording amplifier 34, signal switching units 36, 37 and the rotary transformer 38 as recording signals from the recording head 40 on the magnetic tape, not shown. For data reproduction, recorded signals are read out by the playback head 41 from the magnetic tape, not shown, so as to be outputted as playback signals. At this time, the signal switching unit 36 is set to a terminal b, while the signal switching unit 37 is set to a terminal d. Thus the playback signals from the playback head 41 are routed via the rotary transformer 39, signal switching units 37, 36 and the playback amplifier 35 to the demodulator 33. The demodulator 33 demodulates the playback signals sent thereto into picture signals which are outputted at a signal output terminal 31.

With the rotary transformer of the above-described analog VTR, playback signals which are weaker in signal level than the recording signals are erased by cross-talk such that the so-called recording confidence function of carrying out reproduction simultaneously with recording cannot be realized. With a digital VTR, since the signals handled are of a higher frequency, stray capacitance or inductance produced by interconnection or the rotary transformer deteriorates high-range characteristics. In addition, the number of stages of the rotary transformer is increased due to concurrent recording of plural channels, thus posing a problem.

For overcoming this inconvenience, the system of loading a recording/playback amplifier on a rotary drum has become predominant in particular in a digital VTR. With such signal recording/reproducing apparatus, since the recording/playback signals transmitted through the rotary transformer can be matched in signal level, it becomes possible to alleviate the effects of crosstalk on the recording/playback signals. On the other hand, since the distance between the head and the amplifier can be reduced significantly, the adverse effects of the interconnection may also be lessened. In addition, since a switching circuit can be loaded on the rotary drum, the two opposing heads can exploit one stage of the rotary transformer in common.

However, with the above-described digital VTR, switching, mode exchange or adjustment of the recording current is taken charge of by the rotary drum. For effecting these control operations from the stator, it becomes necessary to transmit control signals to the rotary drum. In general, serial data signals are used because of limitations in routes.

FIG. 2 shows a data format for a compound serial control signal having a waveform of a conventional parallel-serial conversion system. This signal is referred to herein as an MPX signal. A 16-bit bit pattern BP in the MPX signal controls 16 lines: from line 0 to line 5. For turning e.g., the fifth control line on, the MPX signal in which the fifth bit of the bit pattern BP is set to 1 is transmitted.

The MPX signal, as the serial data signal, is generated by latching the information of each control line on the stator side, changing the latched value responsive to the operating mode or the timing and converting the changed value by parallel/serial conversion by a shift register. These serial data signals are inputted to the rotary transformer. On the rotary drum side, the serial data signals are converted by serial/parallel conversion for generating the information which is the same as the latched information on the stator side. The circuitry for generating and converting the MPX signal is of a simplified construction.

Meanwhile, with the MPX signal, generated as described above, since a timing signal having a pre-set time width is allocated to each control line, the length of the serial data is increased with increase in the number of the control lines. Thus, when the transmission of the serial data signal is started, transmission of the next serial data signal cannot be started until the termination of transmission, so that the time interval from a given change to the next change is increased.

On the other hand, since the control line is specified by a timing, it is impossible to shorten the time by employing a method of partially transmitting a portion of serial data.

In addition, if the number of control lines is increased, more timings are required, so that control that is needed becomes frequently difficult. That is, since the resolution along time axis becomes shorter, sufficient control cannot be achieved despite increase in the number of control lines.

OBJECT AND SUMMARY OF THE INVENTION

It is therefore an object of the present invention to provide a signal recording device whereby control signals having higher resolution along time axis can be transmitted more promptly towards the rotary drum.

The present invention provides a signal recording device for transmitting data signals to a rotary drum having a rotary head via a rotary transformer for recording data thereon. The signal recording device transmits a set of serial data signals including a start bit, the information on the sorts of control signals and the information for identifying an object to be controlled by these signals via the rotary transformer to the rotary drum, and decodes the transmitted signals for controlling the object.

The object to be controlled includes a recording amplifier, an erasure amplifier and a playback amplifier, the on/off operation of which is to be controlled.

The object to be controlled may also be an amplitude of the recording signal and the erasure signal, or the frequency of the erasure signal.

A continuation flag specifying the presence or absence of the next following data block may be appended to the serial data signals.

According to the present invention, serial data signals comprised of the start bit, the information on the sort of the control signals, the identification information specifying which of the amplitudes of the erasure signals employed in the recording amplifier, playback amplifier and in the erasure amplifier is the object to be controlled, and the continuation flag, are transmitted to the side of the rotary drum. These serial data signals are decoded on the rotary drum side for controlling the object.

With the signal recording device of the present invention, the above-defined serial data signals are transmitted via the rotary transformer to the rotary drum and subsequently decoded for controlling the object. Since the transmitted data is constituted by only the information of the control line to be changed, control data can be transmitted in a shorter time, thus improving resolution along time axis. Since the length of the transmitted data is changed exponentially with the number of the control lines, the length of the data to be transmitted is scarcely changed with increase in the number of the control lines. Thus the number of control lines can be increased despite constraint as to resolution along the time axis. The signal recording device is also able to cope with changing a large number of control lines at a time.

The object of control includes the recording amplifier, playback amplifier and the erasure amplifier. By controlling the on/off operation of these objects, switching between the recording and playback operations may be achieved with high accuracy.

If the object of control is the amplitudes of the recording signal and the erasure signals or the frequency of the erasure signals, all electrical control required on the rotary drum may be achieved by sole-channel signal transmission. By this control unification, signal management may be facilitated with reduction in cost.

If the continuation flag specifying the presence or absence of the succeeding data block is appended to the trailing end of the serial data signals, it suffices to continue the same data string for simultaneously changing plural control lines, so that it becomes possible to reduce the scale of the dedicated control circuit and to prohibit number of the circuits for data transmission and reception from being increased.

BRIEF DESCRIPTION OF THE DRAWINGS

FIGS. 4A to 4I illustrate signal output timings of respective heads.

FIGS. 5A to 5F illustrate a data format of a MPX signal to a D/A converter.

FIGS. 6A to 6D illustrate demodulation of phase modulated signals.

FIGS. 7A to 7D show a data format of the MPX signal.

DESCRIPTION OF THE PREFERRED EMBODIMENTS

Figure 1:
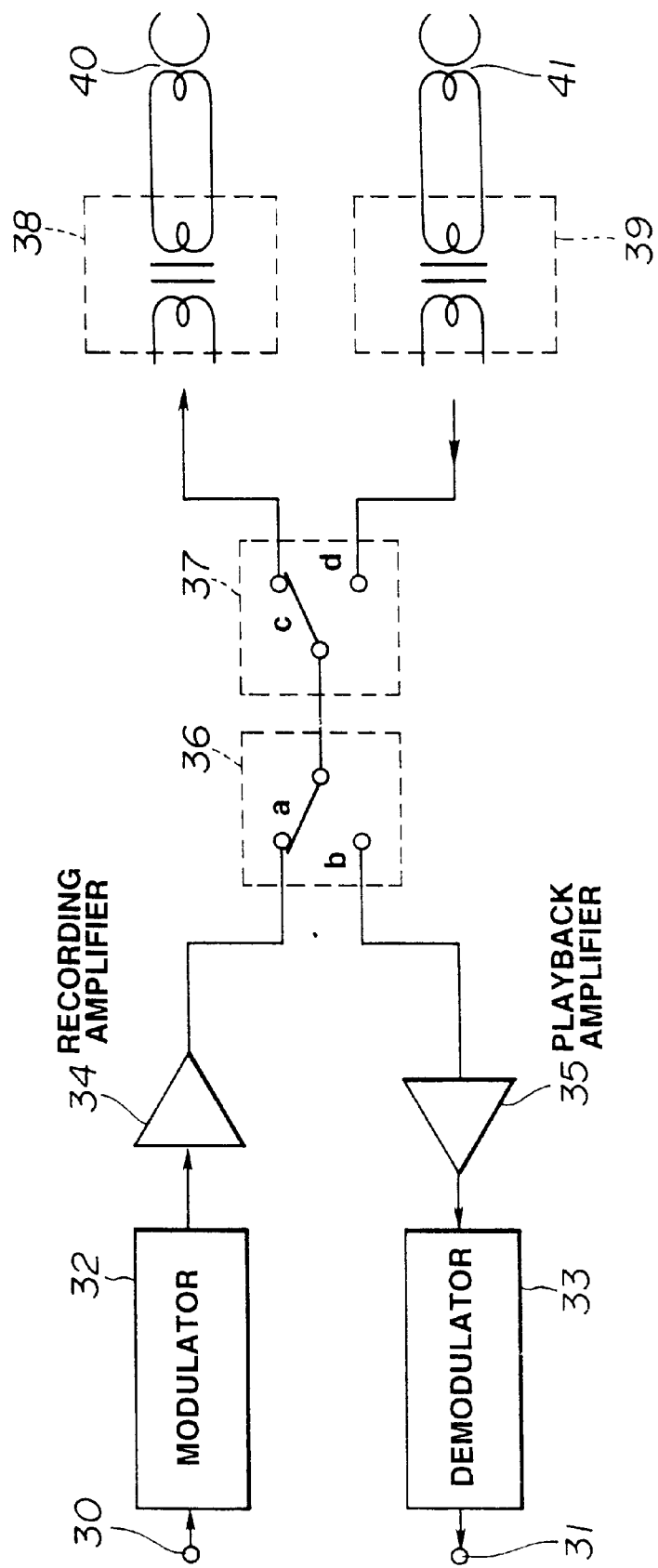
FIG. 1 is a schematic view showing an arrangement of a conventional analog VTR.
Figure 2:
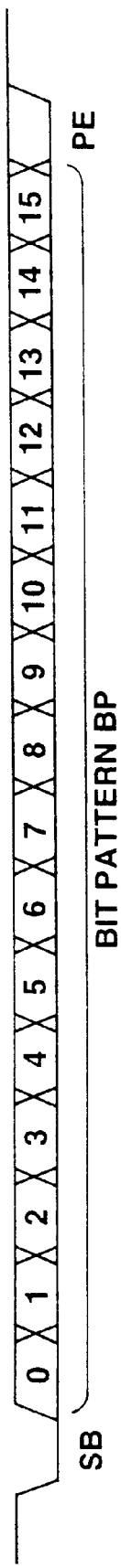
FIG. 2 shows a data format of a conventional MPX signal.
Figure 3:
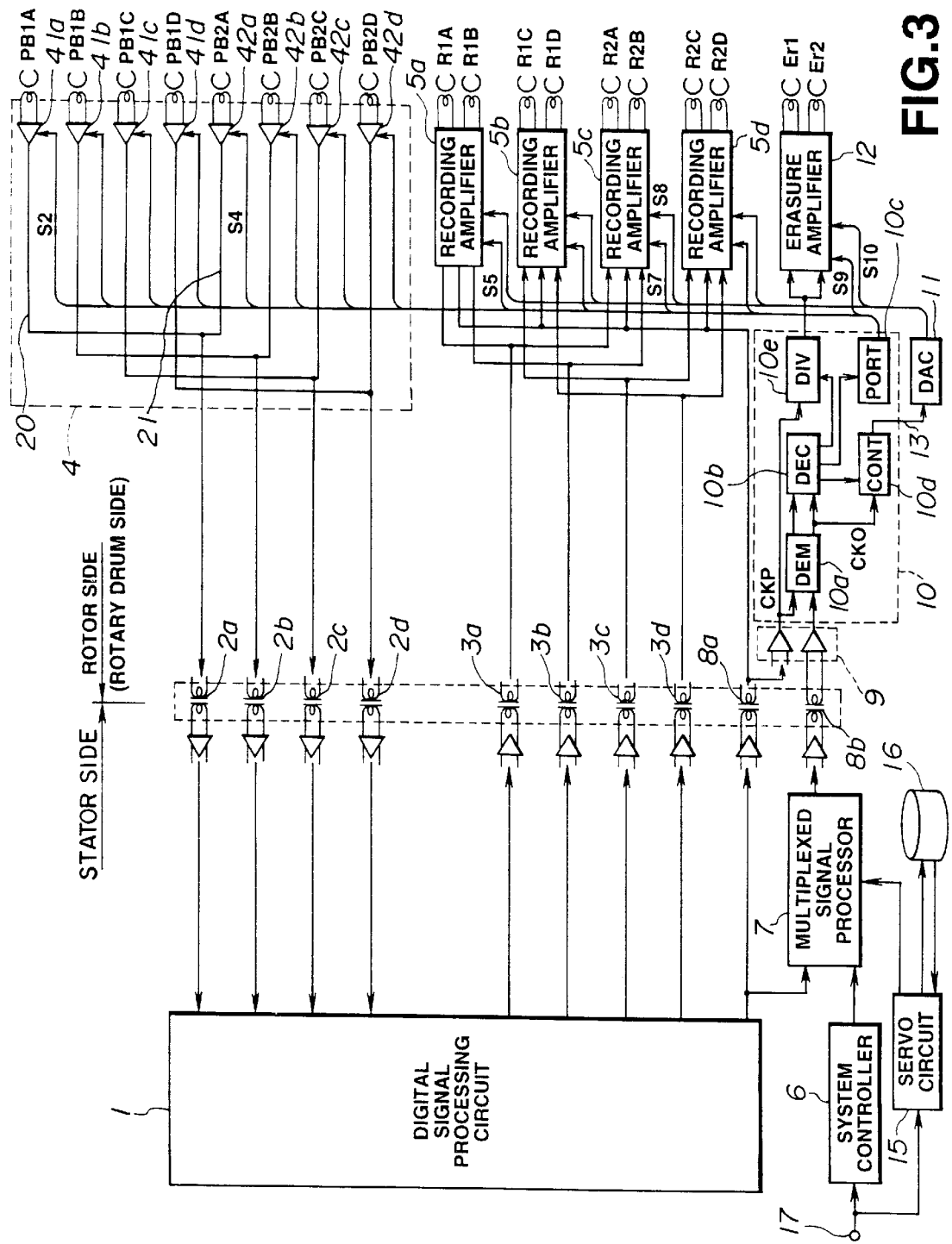
FIG. 3 is a schematic view showing an arrangement of a digital signal recording/reproducing apparatus employing a signal recording device according to the present invention.

Referring to the drawings, preferred embodiments of the present invention will be explained in detail. FIG. 3 shows a schematic arrangement of a digital signal recording/ reproducing apparatus employing a signal recording device according to the present invention. Specifically, the digital signal recording/reproducing apparatus is a digital VTR having a data rate per channel of 110 Mbps, with the maximum fundamental frequency of the data signals being 55 MHz.

A magnetic tape, as a recording medium, not shown, is wrapped 180° around a rotary drum, not shown. For data recording, recording signals of the same channel are recorded by two recording heads arranged in diametrically opposite positions to each other. For data reproduction, signals are reproduced by two playback heads arranged at diametrically opposite positions to each other, as in the case of the recording heads. The symbols affixed to the recording heads and reproducing heads of FIG. 3 denote the combinational correspondence between the recording heads and the playback heads. Specifically, recording signals recorded by the recording head R1A are reproduced by a playback head PB1A, with the recording head R1A facing a recording head R2A. If the head pair facing each other constitutes one channel, there are a sum total of four channels A, B, C and D, so that the recording data rate of the digital VTR of the illustrated embodiment is 440 Mbps. On the other hand, the rpm of the rotary drum is 120, with the time taken per recording track being 4.167 ms.

FIG. 4 shows the signal output timing of the four channels of the recording heads and the playback heads and two erasure heads. The two erasure heads Er1, Er2 sequentially record signals on a magnetic tape at a timing shown in FIG. 4A. During data recording, paired recording heads R1A, R2A; R1B, R2B; R1C, R2C; and R1D, R2D of four channels A, B, C and D sequentially record signals at timings shown in FIGS. 4B, 4C, 4D, and 4E. During data reproduction, paired playback heads PB1A, PB1B; PB1B, PB2B; PB1C, PB2C; and PB1D, PB2D of four channels associated with the recording heads of the four channels sequentially reproduce signals from the magnetic tape at timings shown in FIGS. 4F, 4G, 4H and 4I, respectively.

The recording system is now explained with reference to only the channel A.

Data signals entering a digital signal processing circuit 1 are supplied to the primary side, that is a stator side, of a rotary transformer 3a. These signals on reaching the secondary side, that is the rotor side, of the rotary transformer 3a, assume a waveform containing jitter due to transmission distortion caused by the rotary transformer 3a. Thus the signals are synchronized with a flipflop enclosed in a recording amplifier 5a using clocks supplied from a stage 8a of the rotary transformer 3a, dedicated to clocks, so as to be wave-shaped to signals not containing the jitter. An output voltage of the flipflop is converted by voltage-to-current conversion into a recording current which is supplied to the recording head R1A so as to be recorded on the magnetic tape. This recording current is proportional to the voltage of a current control signal S6 supplied from outside the recording amplifier 5a.

The signals reaching the secondary side of the rotary transformer 3 are also supplied to a recording amplifier 5c connected to the recording head R2A arranged diametrically oppositely to the recording head R1A. The operation of the recording amplifier 5c is the same as that of the recording amplifier 5a. Since the recording head R1A is diametrically opposite to the recording head R2A, the recording head R1A or R2A is not contacted with the magnetic tape during the time when the recording head R2A or R1A is recording data. That is, the recording head R2A is rotated in idle when the recording head R1A is recording data, so that it is unnecessary to supply the recording current to the recording head R2A. The above holds true if the disposition of the recording heads R1A, R2A is reversed. If the recording current is continuously supplied while the recording head is rotated in idle, power consumption on the recording head is significantly increased resulting in heating and increased noise on the power source route thus deteriorating the playback signals. If the current is turned on and off when the recording head is contacted with and clears the magnetic tape, respectively, the time interval corresponding to the nonrecording state of both magnetic heads becomes minimum thus assuring high efficiency. Thus the changeover timing needs to be controlled accurately. On the other hand, if the digital VTR is not in the recording state, no recording current is caused to flow in the two magnetic heads R1A, R2A.

For realizing the above operations, each of the recording amplifiers 5a, 5c has the function of turning the recording current on or off. The function of turning the recording current on or off is controlled by control signals S5 and S7. That is, the control signal S5 is of the logical level 1 only during the time the digital VTR is in the recording state and the magnetic tape is contacted by the recording head R1A. Otherwise, the control signal is of the logical level 0. As for the recording head R2A, a control signal S7 is of the logical level 1 only during the time the magnetic tape is contacted by the recording head R2A and the digital VTR is in the recording state. Otherwise, the control signal is of the logical level 0.

The reproducing system of a channel A associated with the recording system of the channel A in explained.

In the playback system, two playback heads facing each other alternately employ the first stage rotary transformer, so that switching control becomes necessary to perform as in the recording system.

Since the playback heads PB1A, PB2A face each other, and are arranged for tracing the tracks on the magnetic tape on which recording has been made by the recording heads R1A, R2A, respectively. To the playback head PB1A is connected a playback amplifier $4_1a$ for amplifying output signals of the playback head PB1A. It is noted that the playback head PB1A has enclosed therein the function of turning the output voltage off. In a state in which an output voltage of the playback had PB1A is turned off, the input signal is not transmitted to an output terminal 20, while the output terminal 20 is in the floating state. Similarly, there is connected to the playback head PB2A a playback amplifier $4_2a$ having a function similar to that of the playback amplifier $4_1a$. By this function, an output voltage of one of the playback heads PB1A, PB2A may be alternately set to the activated state. For example, if, during the time the playback head PB1A is contacted with the magnetic tape, the playback amplifier $4_1a$ is turned on and the playback amplifier $4_2a$ is turned off, it becomes possible to avoid the effect of an output terminal 21 connected in parallel with the output terminal 20. Since almost all noise of the playback amplifier is generated in an input stage, simple addition without performing such control increases the noise level by 3 dB. An output voltage obtained from the playback heads PB1A, PB2A is transmitted in this manner to the stator side by a sole-stage rotary transformer 2a employed in common on the time-divisional basis.

For implementing this switching function, the playback amplifiers $4_1a$, $4_2a$ are controlled by control signals S2, S4, respectively. If the logical levels of the control signals S2, S4 are 0, outputs of the playback amplifiers $4_1a$, $4_2a$ are turned off, whereas, if the logical levels of the control signals S2, S4 are 1, the outputs of the playback amplifiers $4_1a$, $4_2a$ are turned on. It is necessary for the playback amplifier PB1A to reproduce data only during the time of tracing of the track on the magnetic tape recorded by the recording head R1A. The reason is that, if the playback period is shorter than the recorded track, all recorded information cannot be taken out, whereas, if the playback period is longer than the recorded track, outputting of the facing playback head PB2A is obstructed. Thus the on/off control of the playback amplifiers $4_1a$, $4_2a$ needs to be controlled accurately as in the case of on/off control of the playback amplifiers $4_1a$, $4_2a$.

The erasure heads are hereinafter explained.

Since the erasure head is of a width four times that of the recording head, it is possible to erase four tracks collectively. Thus the number of erasure heads equal to one-fourth the number of the recording heads suffices. Consequently, two erasure heads are provided diametrically oppositely to each other.

To the erasure head Er1 is connected an erasure amplifier 12, as in the case of the recording head. The erasure amplifier 12 is the same in circuit configuration as the recording amplifier 5a and is fed with an on/off control signal S9 and a current control signal S10. The controlling method is similar to that of the recording system, that is, a control signal S9 becomes 1 only during the time the magnetic tape is contacted with the erasure head Er1 for erasing recorded signals. The erasure current is adjusted by the voltage of the current control signal S10 so that erasure will be performed at an optimum current value. The data erasure differs from the data recording only with respect to the input signal to the erasure amplifier 12. That is, the recording amplifier is fed with data signals from the rotary transformer, whereas the erasure amplifier 12 is fed with a signal obtained by frequency-dividing clock signals from a rotary transformer 8a by a frequency divider 10e within the logic circuit 10. The reason is that the erasure signal is a signal of a unitary frequency in distinction from the recording signal. By this logic circuit 10, it becomes unnecessary to supply erasure signals from the stator side, with the rotary transformer being then used exclusively. The ratio of frequency division is varied since the optimum ratio value differs with the modulation system or with the sorts of the magnetic tape.

With the driving system of the signal recording device, the generated frequency signal (FG signals) produced by rotation of the rotary drum 16 and pulses (PG signals) are sent to a servo circuit 15 for detecting the rpm of a rotary drum 16. This servo circuit 15 is fed with reference synchronization signals from a signal input terminal 17 and corrects the rpm based upon the reference synchronization signals. This routes a drive signal from the servo circuit 15 to the rotary drum 16 for controlling its rotation. The detection signal, such as rpm etc. of the rotary drum 16, detected by the servo circuit 15, is sent a multiplexed signal processing circuit 7. The multiplexed signal processing circuit 7 then refers to a detection signal sent thereto for processing data signals from the digital signal processing circuit 1 under control by a system controller 6.

In the present embodiment, the data recording current and the erasure current are controlled by an output voltage of a digital/analog (D/A) converter 11. The D/A converter 11 is constituted as a sole integrated circuit (IC) an has enclosed therein 12 channels of D/A converters each having a resolution of 8 bits. An input to the D/A converter 11 is of a shift register system an input data format of which is shown in FIG. 5.

An input line 13 to the D/A converter 11 is comprised of three lines for three signals, namely a serial data signal DASD shown in FIG. 5D, a transfer clock signal DACK for the serial data signal DASD shown in FIG. 5E and a transfer end signal DALD shown in FIG. 5F. To the serial data signal DASD are time-divisionally allocated 4-bit addresses representing the channels of the D/A converter 11 and 8-bit data written in these addresses. These 12-bit addresses and data correspond to the contents of the data signals DA_data shown in FIG. 5C. The clock signals for capturing the serial data signals DASD are transfer clock signals are transfer clock signals DACK. The serial data signals DASD enter bit the D/A converter 11 bit-by-bit by the rise of each pulse of the transfer clock signals DACK. If, after the 12 bits of the addresses and data are captured by the D/A converter 11, a pulse is applied to the transfer end signal DALD, an output voltage of the designated channel is changed to a specified value.

The input line of the D/A converter 11 is comprised of three signal lines for diminishing the number of connections between ICs. This type of the D/A converter has an extremely small power consumption so that it may be conveniently loaded on the rotary drum.

In the illustrated embodiment, clock signals supplied from the rotary transformer 8a are divided in frequency by two for generating processing clock signals CKO which are employed as processing clock signals in the interior of the logical circuit 10 for generating serial data signals DASD transferred in the control circuit 10d. In addition, the clock signals are further divided in frequency by 32 in the logical circuit 10 to produce transfer clock signals DACK having periods equal to 582 ns.

There are a large number of control lines for control signals required on the rotary drum, as explained above. There are as many as 18 control lines for on/off control signals shown in FIG. 3. In addition, there are required control lines for managing control on the playback function by the recording head or a power-saving switch for the playback amplifier. Besides, these control signals need to be changed by setting from outside the rotary drum. With the digital signal recording device of the present invention, these complex control signals are implemented by compound serial control signals transmitted by only one stage of the rotary transformer 8b, that is MPX signals, and a logic circuit 10 for reading out the contents of the MPX signals.

These MPX signals are serial data. In order for data signals from the digital signal processing circuit 1 to be processed by the multiplexed signal processing circuit 7 controlled by the system controller 6 and to be subsequently transmitted via the rotary transformer 8b, the signals need to be free of dc and low-frequency components. To this end, the MPX signals are modulated by a phase modulation system employing modulation signals NRZI shown in FIG. 5B. With the phase modulation system, a one-bit width is divided into a former half and a latter half and data 0 is converted into a signal which is positive and negative for the former and latter halves, respectively, while data 1 is converted into a signal which is negative and positive for the former and latter halves, respectively. Since the signal modulated by this phase modulation system has the same duration for the positive and negative periods at all times and also has a duty cycle of 50%, this modulation system is convenient for removing low-frequency components.

These MPX signals enter the logic circuit 10 via level converter 9 from the rotary transformer 8b shown in FIG. 3. The clock signals CK for synchronizing the recording signals shown in FIG. 5A are also supplied from the rotary transformer 8a via level converter 9 to the logic circuit 10 as recording clock signals CKP. The reason is that the clocks of the recording signals are used as transmission clocks for the MPX signals.

The phase-modulated MPX signals are demodulated by a demodulator 10a in the logic circuit 10 to a pre-modulation serial data string. Reference is had to FIGS. 6A to 6D for explaining demodulation of the MPX signals. The demodulator 10a sets in store three sorts of modes, that is mode 0, mode 1 and mode 2, depending upon the relation between the clocks of the recording signals and the data rate. For the modes 0, 1 and 2, one data bit becomes one, two and four clocks, respectively. These three sorts of modes are selected in consideration of a variety of conditions, such as recording data rate, required switching time resolution, operating speed limit of the circuit or power consumption.

During the mode 0, the demodulator 10a reads out the MPX signal PEIN shown in FIG. 6B at timings indicated by arrows attached to the recording clock signals CKP shown in FIG. 6A. Since the former and latter halves of the MPX signals PEIN are read out at these timings, 0 or 1 is outputted as serial data string NRZO after lapse of a certain time, as shown in FIG. 6D. The processing clock signals CKO and the recording clock signals CKP shown in FIG. 5C are of the same period.

During the mode 2, since the data rate is one-half that for mode 0, the former and latter halves of the MPX signal PEIN are read out by the same clock polarity. In this case, the MPX signal PEIN is read out by a rising edge of the recording clock signal CKP shown in FIG. 6A. Since the data rate before modulation is such that the recording clock signal CKP is two clocks, with the data being one bit, the processing clock signal CKO shown in FIG. 5C has a period twice that of the recording clock signal CKP.

Finally, for the mode 1, the data rate is one-half that for mode 2, the former and latter halves of the MPX signal PEIN are read by two clocks each of the recording clock signals CKP, with the period of the processing clock signals CKO being four times that of the recording clock signals CKP.

The serial data string NRZO thus produced is of a data format shown n FIGS. 7A to 7D and is decoded by a decoder 10b shown in FIG. 3.

The data format shown in FIGS. 7A to 7D is characterized by transmission only of the state of the control line desired to be changed and the possibility of simultaneously changing plural control lines and of transmitting the information required for setting the D/A converter 11 and the frequency division ratio of the erasure signal. For selecting the three sorts of the data format shown in FIGS. 7A to 7D, a 1-bit start bit SB and a two-bit mode setting bit PD are employed.

The serial data string NRZO, outputted from the decoder 10b, enters a port circuit 10c, which then outputs a plurality of control signals. The control lines for these control signals are grouped according to functions for ease in putting the signal lines in order. Specifically, by allocating the group 1 to a record on/off control line and allocating the group 2 to a playback on/off control line and by unifying the channel numbers in each group according to data recording and playback, integrated data processing becomes possible. In addition, the group numbers may be omitted, as will be explained subsequently, while the logic circuit 10 itself may be designed by a hierarchic structure.

Each data format will be explained in detail.

Referring first to a single-bit mode, it has been customary in data transfer to transmit each unit by transmitting the information of "1" and "0" of all control lines collectively. The receiving side, receiving the transferred data, is capable of performing data processing by having a serial/parallel converting circuit and a latch circuit of a simplified structure. However, if the number of the control lines is increased, as in the illustrated embodiment, the time required for transmitting each unit becomes long in proportion to the number of the control lines, such that the minimum time unit capable of producing a change in the control line becomes longer. This means that resolution along the time axis is deteriorated.

Considering that the number of control lines to be changed simultaneously is usually one and three at most, with the remaining control lines not being changed, each control line is marked with an address in the data format of the illustrated embodiment, and only the addresses of the control lines desired to be changed and the I/O information are sent for shortening the data transfer time for each data transmitting operation. If only one bit is changed, data transmission may be completed with the shortest 11 clocks. There is also provided the function of simultaneously outputting consecutively sent clocks at a time in consideration that plural terminals may be changed simultaneously. Thus it becomes possible to complete data transmission with 29 clocks even when three control lines are changed simultaneously.

Specifically, the first 1-bit start bit SB, and mode setting bits PD made up of a 1-bit HL bit, specifying the mode 0 of the single bit mode, and a bit specifying 1 (high) 0 (low) of the control line, are followed by 3-bit group bits GP specifying the group number of the control line and 3-bit channel bits CL specifying the bit number in the group, as shown in FIG. 7A. The channel bit CL is followed by an even parity PE which in turn is followed by a continuation flag CF. If the continuation flag CF is set to 0 (low) for specifying further data continuation, the sequence from the HL bit in the mode setting bit may be iteratively transmitted for effecting concurrent changes of plural bits.

FIG. 7B shows a multi-bit mode which is a mode for concurrent writing in control lines of each group in case a large number of control lines are changed simultaneously. For this mode, the resolution is not required. For this multi-bit mode, similarly to the single-bit mode, a 1-bit start bit SB and 2-bit mode setting bits are sent first. The 2-bit mode setting bits for this multi-bit mode basically has values of 1 and 0. The mode setting bits are followed by 3-bit group bits GP specifying the group number, the 8-bit bit pattern BP specifying the states of the control lines in the group and a 1-bit even parity PE. This enables concurrent setting of I/O of eight control lines in the group. If plural groups are to be changed concurrently, the continuation flag CF is set to 0 (low) and the bit pattern BP is transmitted as in the case of the single bit mode. For shortening the transfer time as much as possible, the group bit GP is omitted. The group number is automatically incremented by sending the continuation flag CF. Specifically, transfer of the address information for the group 4 may be omitted if the control liens for the groups 3 and 4 are changed concurrently.

In addition to the on/off control by the above-described data format, it is necessary to effect control of the recording current and setting of the erasure signal. FIGS. 7C and 7B show a data format for effecting the control and setting operations.

First, D/A data shown in FIG. 7C are sent to the D/A converter 11. The D/A data also starts with a 1-bit start bit SB and 2-bit mode setting bits PD. Specifically, the 2-bit mode setting bits have the values of 1, 1. The mode setting bits are followed by the address of the D/A converter 11, that is the 4-bit channel number DAN specifying the channel number, 8-bit data DAD specifying the channel data and a 1-bit even parity PE. Since the D/A converter 11 has 12 channels enclosed therein, channel numbers of 0 to 11 may be optionally set as the channel numbers DAN.

The logic circuit 10 on receiving D/A data from the D/A converter 11 sends the D/A data to a control circuit 10d. The D/A data is processed by the control circuit 10d with numerical conversion and bit re-arraying and routed via input line 13 to the D/A converter 11 with a format of a data signal DA_data as shown in FIG. 6C.

On the other hand, the erasure frequency can be set when 14 is specified as an address of D/A data shown in FIG. 7C. The reason is that the D/A converter 11 has 12 channels, while the channel number DAN has 4 bits, such that the address values 12 to 15 remain unused. The data format for the erasure frequency is indicated by erasure data of FIG. 7D. That is, a 1-bit start bit SB and a 2-bit mode setting bits PD having values of 1, 1 are followed by a value in binary representation, specifically four bits of 0, 1, 1, 1, followed by 8-bit frequency division values DN and a 1-bit even parity PE. The data length is 6 bits since a frequency divider 10e has a length of six bits.

When the logic circuit 10e receives erasure data shown in FIG. 7D, the value of the erasure data is written in the frequency divider 10e. Since the erasure signal needs to have a duty ratio of 5%, the value of frequency division is set so as to be one-half the set value. If the value of frequency division is 0, the erasure signal is outputted without frequency division. The clock signals employed in the frequency divider 10e are not the processing clock signals CKO employed in the demodulator 10a, but are recording clock signals CKP from the rotary transformer 8a.

Although the control lines are grouped into eight lines as unit, they may be grouped into any other optional numbers. Although the number of groups is set to a maximum of eight and 3 bits are allocated as group bits specifying the group number, the number of the group bits may be set to a number other than 3 depending upon the sorts of the controlled signals.

In addition, although the start bit in the data format of the transferred MPX signal is 0 and the next following two bits are mode setting bits, the data format is not limited thereto. Also the even parity used for confirmation of the received data may be replaced by odd parity. Alternatively, no parity may be used, or a parity made up of plural bits may be employed.

The above-described D/A converter employs an IC having 12 channels enclosed therein. However, the control similar to that used for the IC having 12 enclosed channels may be achieved with the use of ICs having a different number of channels or plural ICs. The frequency divider for erasure signals may be of a bit number other than six.

The phase modulation of the MPX signal, employed in the illustrated embodiment for low-range cut-off of the rotary transformer, may be replaced by other modulation systems, such as frequency modulation. Alternatively, no modulation may be used. In addition, a slip ring may be employed in place of the rotary transformer.

Although only the D/A converter is employed as an element in need of communication on the rotary drum, similar application may be made for communication with other devices. The direction of communication exchange is also not limited to that shown in the illustrated embodiment.

Although the logic circuit is implemented as a sole LSI, it may be split according to functions into plural LSIs or constituted by combining plural ICs or individual components. If the logic circuit is composed of partial circuits according to functions, common clock signal may be employed for communication between elements.

In addition, although the rotary erasure heads are loaded on the VTR in the illustrated embodiment, and the recording/erasure current may be optionally set, the illustrated embodiment may also be adapted for application to a VTR not having one or both of these functions. If both of these functions are required, these may be partially implemented by other means. The present invention may also be applied to a device not having any one of the recording and reproducing functions.

What is claimed is:

1. A signal recording and reproducing device for transmitting and receiving data, via a rotary transformer, to and from a rotary drum having a rotary head for carrying out data recording and reproducing operations on a recording medium, comprising:

means for generating a serial data stream having a plurality of bits corresponding to a plurality of control signals, said serial data stream being divided into at least a first group including a start bit, a second group including bits for selectively activating said control signals for effecting an operation to be performed during one of said data recording and reproducing operations, and a third group including additional bits for activating said control signals for selecting an object which performs the effected operation; and means for decoding said bits located in said three groups.

2. The device according to claim 1, wherein said rotary drum comprises an erasure amplifier and a playback amplifier, and said selected object for performing said selectively activated operation is one of said erasure amplifier and playback amplifier.

3. The device according to claim 2, wherein said selectively activated operation is an on/off operation.

4. The device according to claim 1, wherein said control signals include a first signal for recording data and a second signal for erasing data, said first and second signals having respective amplitudes controlled via said decoded bits.

5. The device according to claim 1, wherein said control signals include a signal for erasing data, said signal having its frequency controlled via said decoded bits.

6. The device according to claim 1, wherein said serial data stream includes a continuation flag for indicating whether a succeeding data stream is appended to said serial data stream.

7. A signal recording and reproducing device for transmitting and receiving data, via a rotary transformer, to and from a rotary drum having a rotary head for carrying out data recording and reproducing operations on recording medium, comprising:

a recording amplifier, an erasure amplifier and a playback amplifier located in said rotary drum;

said rotary transformer having one channel for transmitting said data and another channel for transmitting a plurality of control signals for controlling operations of said recording amplifier, erasure amplifier and playback amplifier; and means for generating a serial data stream having a plurality of bits corresponding to said control signals, said serial data stream being divided into at least a first group which includes a start bit, a second group which includes bits for selectively activating said control signals for effecting an operation to be performed during said data recording and reproduction operation, and a third group which includes additional bits for activating said control signals for selecting an object which performs the effected operation.

* * * * *